United States Patent [19]

O'Brien

[11] Patent Number: 5,202,995

[45] Date of Patent: Apr. 13, 1993

[54] METHOD FOR REMOVING INVARIANT BRANCHES FROM INSTRUCTION LOOPS OF A COMPUTER PROGRAM

[75] Inventor: John K. P. O'Brien, South Salem, N.Y.

[73] Assignee: International Business Machines Corporation, Armonk, N.Y.

[21] Appl. No.: 939,586

[22] Filed: Sep. 3, 1992

Related U.S. Application Data

[63] Continuation of Ser. No. 420,789, Oct. 12, 1989, abandoned.

[51] Int. Cl.$^5$ .............................................. G06F 15/38
[52] U.S. Cl. .............................. 395/700; 364/DIG. 1; 364/280.5; 364/DIG. 2; 364/973
[58] Field of Search ................................. 395/500, 700

[56] References Cited

U.S. PATENT DOCUMENTS

| | | | |
|---|---|---|---|
| 4,567,574 | 1/1986 | Saade et al. | 395/700 |
| 4,656,582 | 4/1987 | Chaitin et al. | 395/700 |
| 4,656,583 | 4/1987 | Auslander et al. | 395/700 |
| 4,773,007 | 9/1988 | Kasada et al. | 395/700 |
| 4,991,088 | 2/1991 | Kam | 364/200 |

OTHER PUBLICATIONS

Henhapl et al. "Parallel Loop Structures" IBM Technical Disclosure Bulletin vol. 16, No. 4, Sep. 1973 pp. 1047-1049.
Kizis, "Loopable Code Enhancement For An Ate Compiler" IBM Technical Disclosure Bulletin, vol. 25, No. 11B, Apr. 1983 pp. 6085-6089.
A. K. Chandra, "Identifying Inner Loops Of Programs" IBM Technical Disclosure Bulletin, vol. 18, No. 10, Mar. 1976 pp. 3514-3515.
P. F. Carpenter et al. "Program Optimization Technique" IBM Technical Disclosure Bulletin, vol. 12, No. 6, Nov. 1969, pp. 891-893.
F. E. Allen et al. "A Catalogue of Optimizing Transformations" IBM T. J. Watson Research Center Yorktown Heights, New York, 1972.
Robert Tarjan "Depth-First Search and Linear Graph Algorithms" Siam J. Comput. vol. 1, No. 2, Jun. 1972 pp. 146-160.
Barrett et al., "Compiles Construction: Theory and Practice," Science Research Associates, Inc., Chicago, 1979, pp. 551-587.
Bauer et al., "Compiler Construction an Advanced Course," 2nd ed., Springer-Verlag, New York, 1976, pp. 549-603.
Gries, David, "Compiler Construction For Digital Computers," John Wiley and Sons, New York, 1971, pp. 376-411.
Lewis et al., "Compiler Design Theory," Addison-Wesley, Mass., 1976, pp. 559-569.

Primary Examiner—Thomas C. Lee
Assistant Examiner—Richard Lee Ellis
Attorney, Agent, or Firm—Ratner & Prestia

[57] ABSTRACT

Removal of invariant branches from nests of loops results in an optimized computer program with increased speed of execution. To accomplish this objective, each loop of a program is then examined, looking at inner loops before their containing outer loops, to locate conditional branch instructions which are loop invariant. Each conditional branch which is evaluated based upon loop invariant calculations is rewritten, outside the outermost loop for which this branch is invariant. The moved branch is modified to branch around the loop in which it was originally contained if its condition is evaluated false. A new copy of the loop is made in which the invariant branch is rewritten as an unconditional branch. In the original copy of the loop, the invariant branch is deleted, and a branch is inserted after the modified original loop to skip around the new copy when the original copy is executed. Finally, any sections of the program which will never be executed as a result of the above described transformation are deleted.

10 Claims, 12 Drawing Sheets

```
100    START LOOP
         .
         .
150    BRANCH ON CONDITION TO 250
         .
         .
200    BRANCH TO 300
         .
         .
250    LABEL
         .
         .
300    LABEL
         .
         .
400    END LOOP
         .
         .
900    STATEMENT
         .
         .
999    STOP
```

FIG. 7A

| 50 | BRANCH ON CONDITION TO 450 |
| 100 | START LOOP |
| 150 | (* BRANCH DELETED *) |
| 200 | BRANCH TO 300 |
| 250 | LABEL |
| 300 | LABEL |
| 400 | END LOOP |
| 440 | BRANCH 700 |
| 450 | START LOOP |
| 500 | BRANCH 650 (* CHANGED TO UNCONDITIONAL *) |
| 550 | BRANCH TO 650 |
| 600 | LABEL |
| 650 | LABEL |
| 680 | END LOOP |

FIG. 7B
```
        ⋮
700    LABEL
        ⋮
900    STATEMENT
```

FIG. 8

| 100 | START LOOP |
| 200 | (* BRANCH TO 300 DELETED *) |
| 300 | LABEL |
| 400 | END LOOP |
| 440 | BRANCH 700 |
| 450 | START LOOP |
| 500 | (* BRANCH TO 600 DELETED *) |
| 600 | LABEL |
| 650 | LABEL |
|     | END LOOP |
| 700 | LABEL |
| 900 | STATEMENT |
| 999 | STOP |

METHOD FOR REMOVING INVARIANT BRANCHES FROM INSTRUCTION LOOPS OF A COMPUTER PROGRAM

This application is a continuation of application Ser. No. 07/420,789 filed Oct. 12, 1989, now abandoned.

BACKGROUND OF THE INVENTION

1. Field of Invention

This invention is in the field of computer program compilation, and specifically is directed to optimizing computer programs. In particular, a method is set forth for the removal of invariant branches from instruction loops of a computer program.

2. Description of the Prior Art

After a computer program has been written in a high level language (i.e. Fortran, Pascal, C), a compiler program is typically used to convert this program into a sequence of machine language instructions to be executed by a computer. These machine language instructions are also called object code. There are many ways to express a program written in a high level language in object code. In particular, some object code interpretations of the high level language program will run faster than others. For this reason, compiler systems are often equipped to perform a procedure called code optimization. Code optimization is a technique whereby object code is improved so that a program will execute in less time.

Code optimization can be achieved through numerous methods. Repetitious computations may be deleted. Variables that never change may be replaced with constants. An expression within a loop which is always evaluated identically regardless of loop iteration can be moved to a location outside of the loop.

A particular area of interest in the field of code optimization relates to decreasing the running time of program loops, i.e., sections of programs that repeat. Because computer programs spend a relatively large amount of time executing instructions in loops, a code optimization technique which decreases loop execution time can be extremely useful for improving the execution time of the entire computer program.

A common method of improving loop performance is to relocate a computation that produces the same result each time around the loop to a point in the computer program just before the loop begins execution. In this way the computation need only be done once, when the loop is entered, rather than each time the loop is repeated. Such a computation is called a loop invariant.

U.S. Pat. No. 4,567,574 to Saade et al. relates to a method for optimizing COBOL source programs which include PERFORM statements. Where appropriate, the code for the procedure or simplified linkage code is substituted for the PERFORM statement.

U.S. Pat. No. 4,656,582 to Chaitin et al. relates to an optimization method which uses "code motion" and "common subexpression elimination." For instructions which may use values in memory or values in temporary registers, the optimization method selects the best form of instruction for the context in which it lies.

U.S. Pat. No. 4,773,007 to Kasada et al. relates to a method of data flow analysis for determining array element interdependence as a precursor to program code optimization.

SUMMARY OF THE INVENTION

The present invention operates by optimizing a computer program that contains loop invariant conditional branch instructions. Once optimized, the computer program can be executed in a shorter amount of time than before it was optimized.

In the present invention, a method is set forth for the removal of loop invariant conditional branch instructions from the computer program in which these instructions reside.

Operation of the present invention occurs in a series of steps as follows: First, each loop of the program is examined, inner loops are inspected before their containing outer loops, to locate conditional branch instructions which are loop invariant. Each conditional branch in which the condition includes only loop invariant calculations is rewritten, outside the outermost loop for which this branch is invariant. The moved branch is modified to branch around the loop in which it was originally contained if its condition evaluates to a first predetermined logical value. A new copy of the loop is made in which the invariant branch is rewritten as an unconditional branch. This branch and all other branches in the copied loop are modified relative to the beginning of the copied loop. In the original copy of the loop, the invariant branch is deleted, and a branch is inserted after the modified original loop to skip around the new copy when the original copy is executed. Finally, as an optional step, any sections of the program which will never be executed as a result of the above described transformation are deleted.

DETAILED DESCRIPTION

The following are definitions of terms that are used in the description of the invention that follows.

Figure 1:
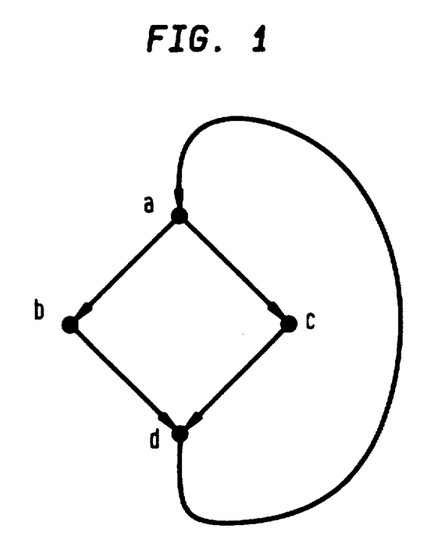
FIG. 1 is an exemplary graph which is strongly connected and which is useful for explaining the present invention.
Figure 2:
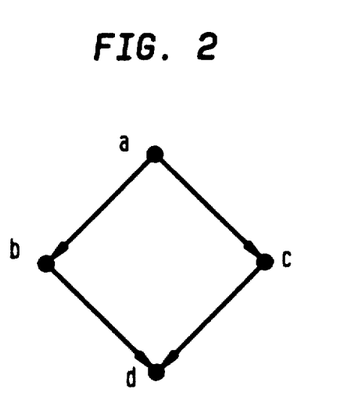
FIG. 2 is an exemplary graph which is not strongly connected and which is useful for explaining the present invention.

STRONGLY CONNECTED REGION (SCR)—A directed graph in which for every two vertices (A) and (B) in the graph there is a path from (A) to (B) as well as a path from (B) to (A). FIG. 1 illustrates a strongly connected graph. This graph is strongly connected because there is a path from any node in the graph to any other node in the graph. FIG. 2 is an example of a graph which is not strongly connected. This graph is not strongly connected because, for example, there is no path from node d to node a.

Figure 3:
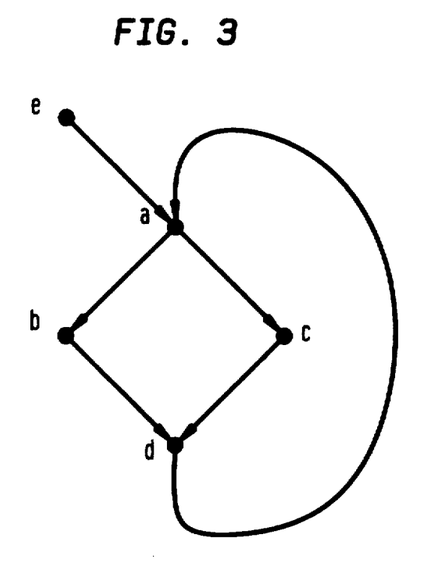
FIG. 3 is an exemplary graph which includes a single entry strongly connected region and which is useful for explaining the present invention.
Figure 4:
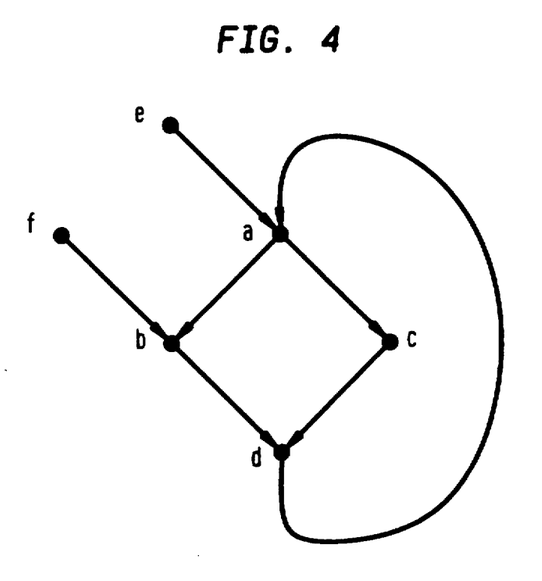
FIG. 4 is an exemplary graph which is not single entry strongly connected and which is useful for explaining the present invention.

SINGLE ENTRY STRONGLY CONNECTED REGION (SESCR)—A strongly connected region in which there is only one node which has predecessors outside the strongly connected region. A single entry strongly connected region corresponds to the common programming notion of a loop. FIG. 3 is an example of a graph which contains a single entry strongly connected region. This graph illustrates a SESCR because the only path from node e to strongly connected subgraph a,b,c,d is through node a. In FIG. 4, an example of a graph is shown that is not single entry strongly connected. This graph is not a depiction of a SESCR because there are two nodes which have predecessors outside the strongly connected region (i.e. node f is a predecessor of node b and node e is a predecessor of node a).

REGION CONSTANT (RC)—With respect to a SESCR, a value that is not computed in the SESCR. In FIG. 3, node e illustrates a region constant.

ARTICULATION NODE (AN)—A node of a subgraph which must be visited on every traversal of the sub-graph. In FIG. 1, nodes a & d are articulation nodes.

PREDICATE—A mathematical relationship which determines the behavior of a conditional instruction.

CONDITION CODE—An indication of whether a value is negative, zero, or positive.

In the process of optimizing a computer program, it may be desirable to relocate a conditional branch instruction to a point outside of its originally containing loop. This may occur, for example, when a conditional branch instruction demonstrates the property of loop invariance, which is to say, it is evaluated identically regardless of the iteration of the loop. The relocation of such a statement to a point just prior to loop execution alleviates repetitious, unnecessary evaluations. For example, in pipelined computer systems without sophisticated branch prediction hardware, conditional branch instructions may significantly reduce processor utilization. Thus, by reducing the number of conditional branch instructions encountered during the executions of a program a major, positive impact on program running time may be achieved.

In the exemplary embodiment of the invention described below, a loop that has an invariant conditional branch instruction is transformed into two loops. The first loop is the original loop. The second loop is an exact copy of the original loop. However, the destination of branches in the second loop are modified relative to the beginning of the second loop. In the first loop the conditional branch instruction is deleted and nothing is put in its place. In the second loop the conditional branch instruction is replaced with an unconditional branch instruction. The condition of the original conditional branch instruction may be evaluated before either loop is entered. If this condition evaluates false, then the first newly created loop is executed. Otherwise, the second newly created loop is executed. In this way, the condition is evaluated only once, as opposed to an evaluation for every iteration of the loop. This technique is called unswitching.

Figure 5A:
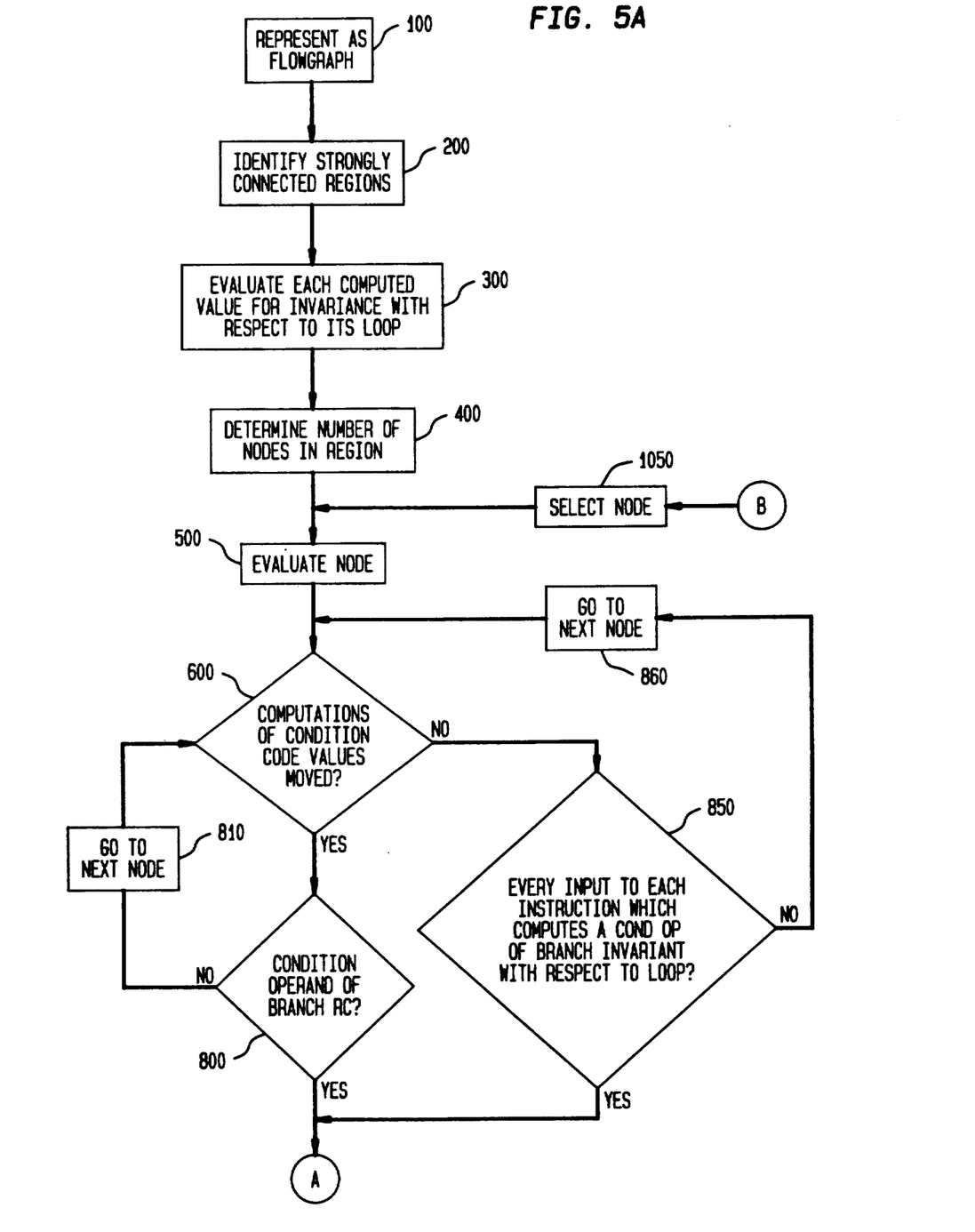
FIGS. 5A and 5B are a flow chart diagrams which illustrate the operation of the present invention.

Operation of the present invention is shown in FIG. 5. Before analyzing a computer program for optimization, it is desirable to represent the program as a flow graph (step 100). In the present embodiment of the invention, the Tarjan algorithm is used to accomplish this task. However, any method of constructing a flow graph may be used. The Tarjan algorithm is described in an article by Tarjan, R. E., "Depth first search and linear graph algorithms," SIAM J. Computing 1:2 at pages 146-160 which is hereby incorporated by reference.

Once the flow graph has been generated, it is possible to identify loops which may be targets for optimization within the program. This is accomplished by locating SESCR's of the flow graph (step 200). In this embodiment of the invention, SESCR's are identified by using an algorithm set forth in the referenced Tarjan article. However, any algorithm for identifying SESCR's can be used.

In step 300, each computed value in a SESCR is evaluated to determine whether or not that computation is invariant with respect to the loop in which it resides. Computations that possess this property are so marked. A computation is invariant if it is characterized as a region constant in a directed graph representation of the program.

Methods of identifying region constants are well known in the art. In this embodiment of the invention, the following algorithm is used. The first step is to perform invariant code motion as set forth in Chapter 13 of *Principles of Compiler Design* by A. Aho et al. Addison Wesley, 1979 pages 454-471, which is hereby incorporated by reference. Next, for each SESCR in the flow graph, all results computed by the program are placed into a working set for the region under consideration. Each basic block (flow graph node) in the region is then examined and each computation performed in the block is removed from the working set. When all of the blocks in the region have been examined, the computations remaining in the working set are the region constants.

After identifying the region constants, the next step in this optimization process is to determine those branches which depend on invariant predicates. The number of nodes in each region is determined (step 400). The flow chart of FIGS. 5A and 5B has been simplified to show operations performed on one SESCR. However, in the exemplary embodiment of the invention, each SESCR is considered, starting with innermost SESCR's of a directed graph and working outward. In considering each node in the SESCR (step 500), single node regions may be ignored, since they have no interior branches. Also latch nodes (i.e. a node in the loop which is at the predecessor of the loop header) may be ignored.

There are at least two methods to determine which branches depend on invariants. The method used depends on whether condition code values have previously been moved in the computer program by other code optimization processes (step 600).

Where the optimization process has moved the condition code computations outside of the loop, the condition part of the branch is examined to determine if it is a region constant (step 800). If the condition part of the branch is a region constant, then the conditional branch instruction is invariant with respect to the loop in which it resides (step 900 via off page connector A). Otherwise, the node is ignored and the next node is evaluated (step 810).

Where condition code computations have not been moved, every input value to each instruction which computes a condition operand of a branch is examined (step 850). If every input value is invariant with respect to the loop under analysis, then the condition part is invariant with respect to this loop (step 900 via off page connector A).

Figure 5B:
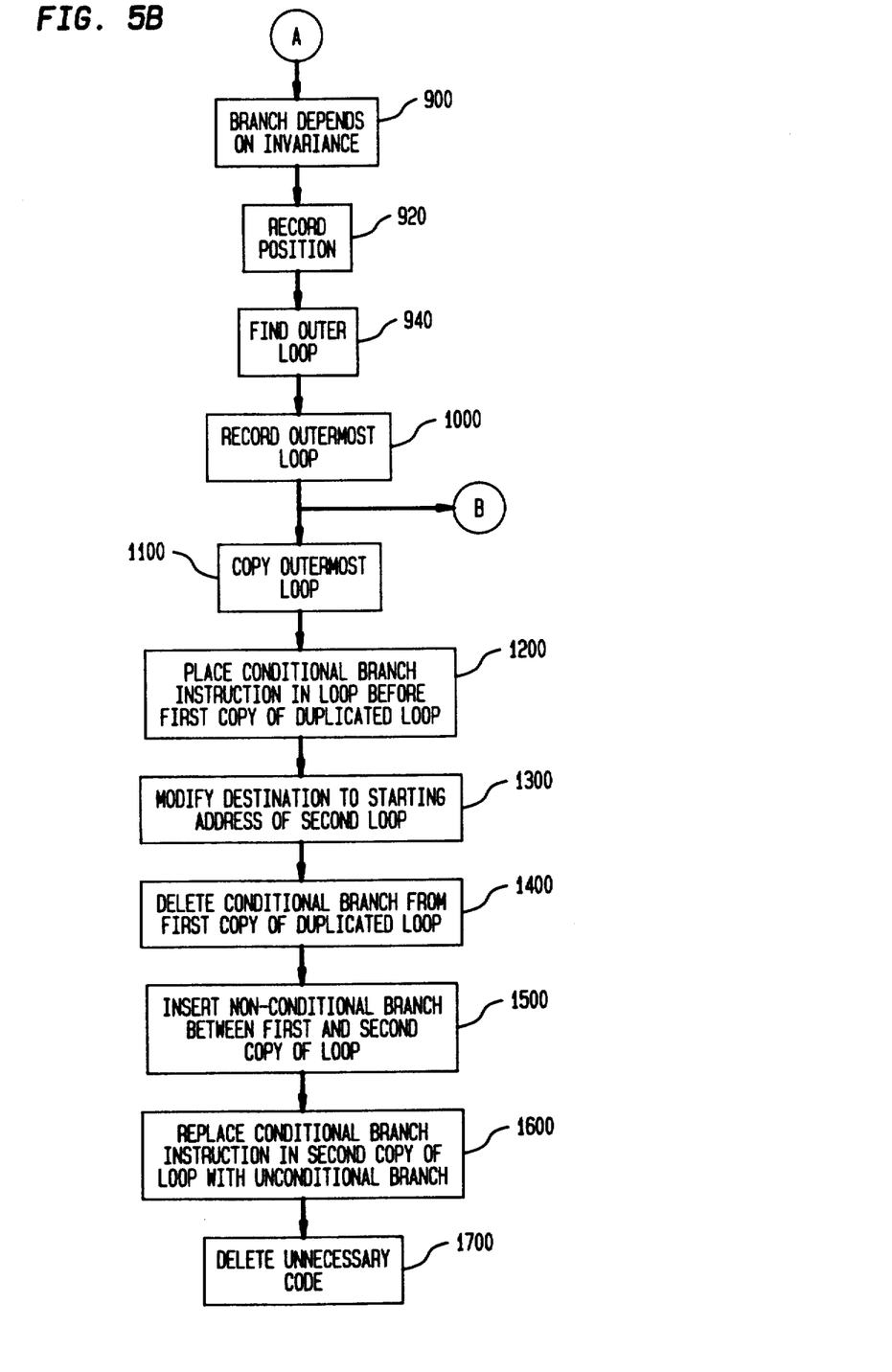

Otherwise the next node in the loop is evaluated (step 860). If a branch instruction is invariant with respect to the loop in which it resides, its position is recorded (step 920) and a search is conducted to determine the outermost loop for which the invariance holds (step 940). This is done by applying the region constant algorithm (previously referenced) to nodes adjacent to that recorded in step 920 (step 1050 via off page connector B). In this way, the branch can be moved to a point outside of the loops for which it is invariant, thereby decreasing the program execution time as set forth above. The position of this outermost loop is then recorded (step 1000).

In the present embodiment of the invention, nodes are only evaluated if they are articulation nodes of an instruction loop of the computer program. However, it is contemplated that this restriction may be removed. Algorithms for finding articulation nodes are well known in the field of graph theory.

After loops have been identified for optimization, the computer program may be rewritten in order to achieve optimization. Loops are processed in the inverse order of their identification.

In step 1100, a loop which has been identified for optimization is copied. This results in two copies of the loop. A first copy of the loop will be executed if the invariant conditional branch evaluates to false. The second copy of the loop will be executed if the invariant conditional branch evaluates to true. In creating the second copy, the destination of branches in the copy are modified relative to the beginning of this loop.

At step 1200, the conditional branch instruction is placed in the program before the original copy of the loop. The destination of this conditional branch instruction is modified to be the starting address of the second copy of the loop (step 1300).

At step 1400, the conditional branch instruction, which is located in the first copy of the duplicated loop, is deleted. Nothing is put in its place.

At step 1500, a non-conditional branch instruction is inserted between the first and the second copies of the duplicated loop. The destination of this branch is the instruction immediately following the second copy of the duplicated loop. In this way, when execution of the first loop is complete, program execution will jump over the second loop, to the instruction that followed the original loop in the unmodified program.

At step 1600, the conditional branch instruction which is located in the second copy of the loop is replaced with an unconditional branch. The destination of this branch is the target of the original conditional branch instruction.

Finally, at step 1700, code, which has become unnecessary for proper program operation (i.e. unreachable code) as a result of optimization, is deleted. While any applicable algorithm may be used to accomplish this objective, an exemplary algorithm is described in chapter 15 of *Principles of Compiler Design*, by A. Aho et al., Addison Wesley, 1979, pages 549-550, which is hereby incorporated by reference.

Figure 6:
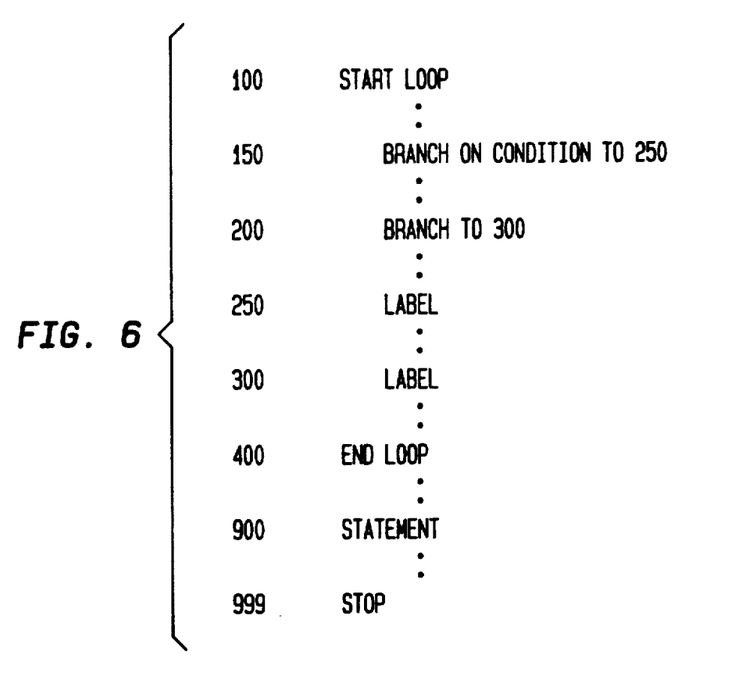
FIG. 6 is an exemplary computer program which is useful for describing the present invention.

FIGS. 6, 7A, 7B and 8 an illustrate the operation of the algorithm discussed in reference to FIGS. 5A and 5B above. The exemplary program of FIG. 6 is depicted graphically in FIG. 9A. This program contains a branch instruction which is invariant with respect to the loop in which it is contained.

Figure 7A:
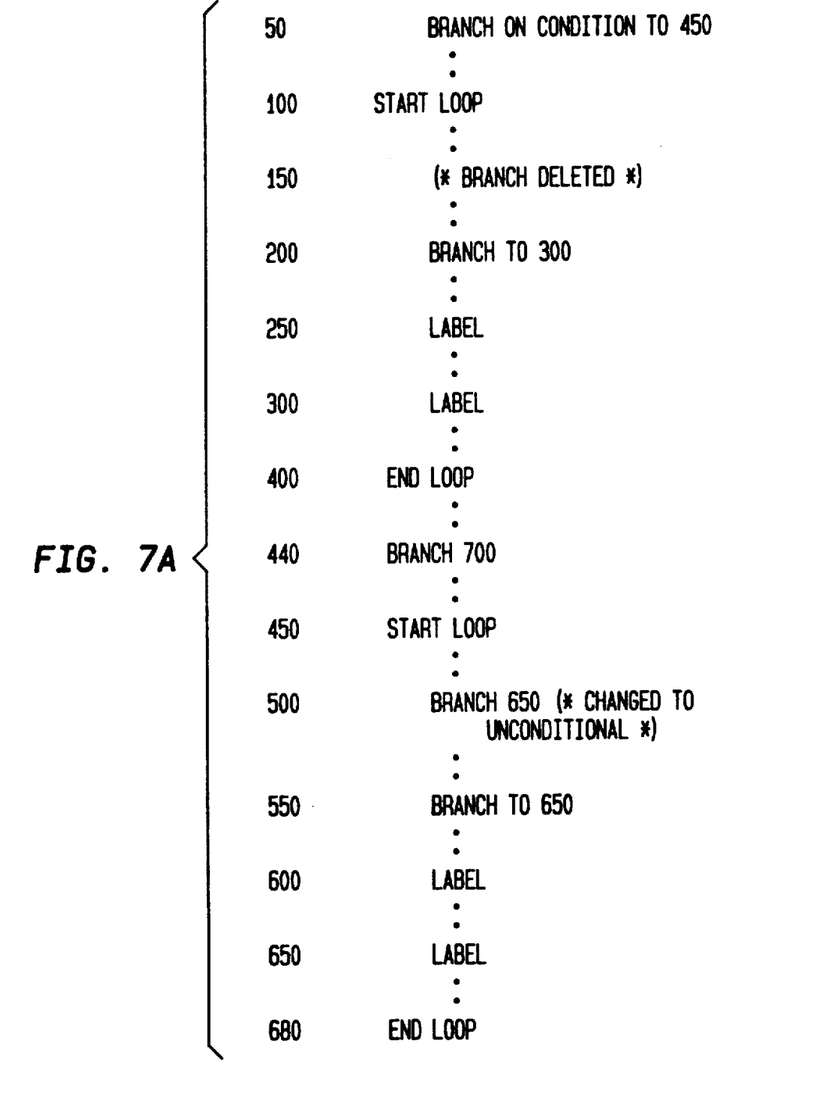
FIGS. 7A and 7B each include a portion of the exemplary computer program of FIG. 6 and further includes a conditional branch instruction placed before the computer code in both loops of the computer program.
Figure 7B:
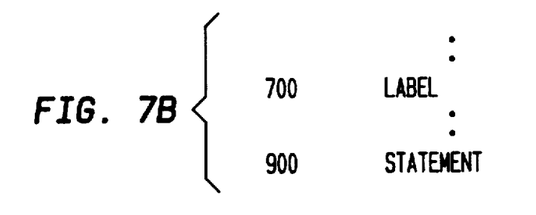

As can be seen, the loop which is shown in lines 100-400 of FIG. 6 is duplicated and appears in FIG. 7A at lines 100-400 and 450-680. In duplicating the loop, the destination of branches in the duplicate loop are modified relative to the beginning of this loop. In line 50 of FIG. 7A, a conditional branch instruction is placed in the computer program before the code for either loop. In FIG. 7A, line 150, the conditional branch instruction is deleted and at line 500, the conditional branch instruction of the prior figure is replaced with an unconditional branch in the second copy of the loop. The destination of this branch remains the same, relative to the beginning of the loop in which it resides.

Figure 8:
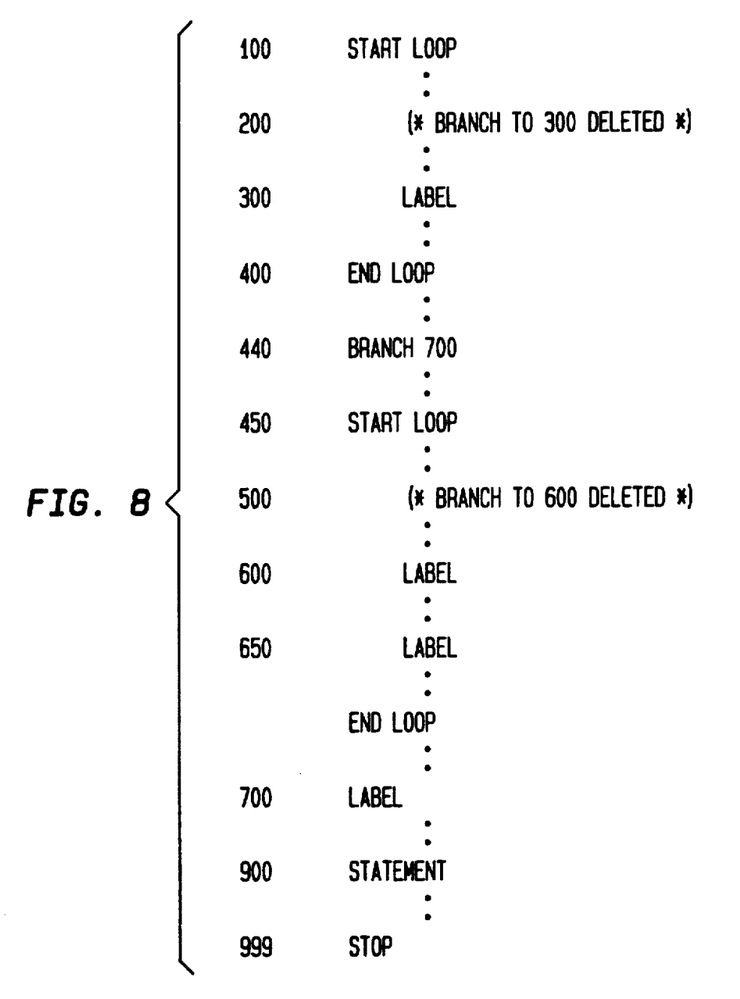
FIG. 8 is the exemplary computer program of FIGS. 7A and 7B after unreachable code has been deleted.
Figure 9A:
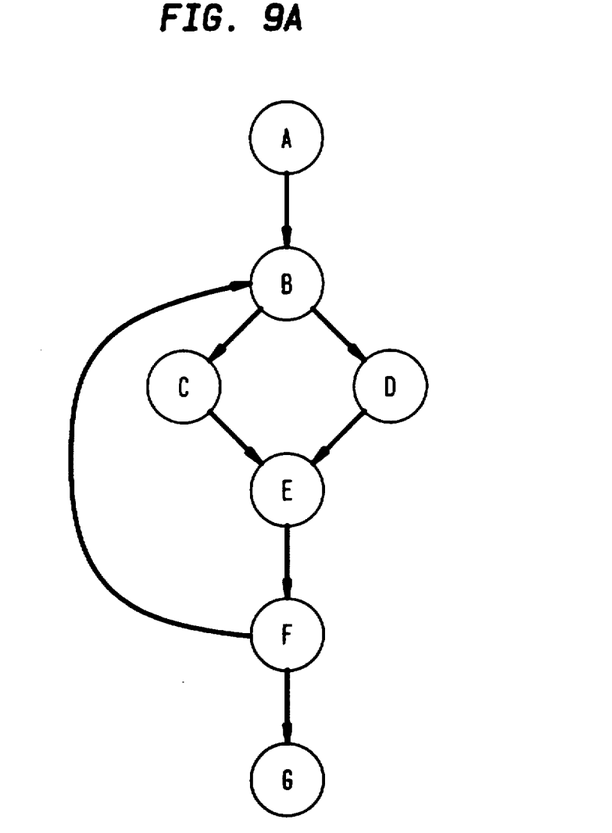
FIG. 9A is a graphical representation of the computer program shown in FIG. 6.
Figure 9B:
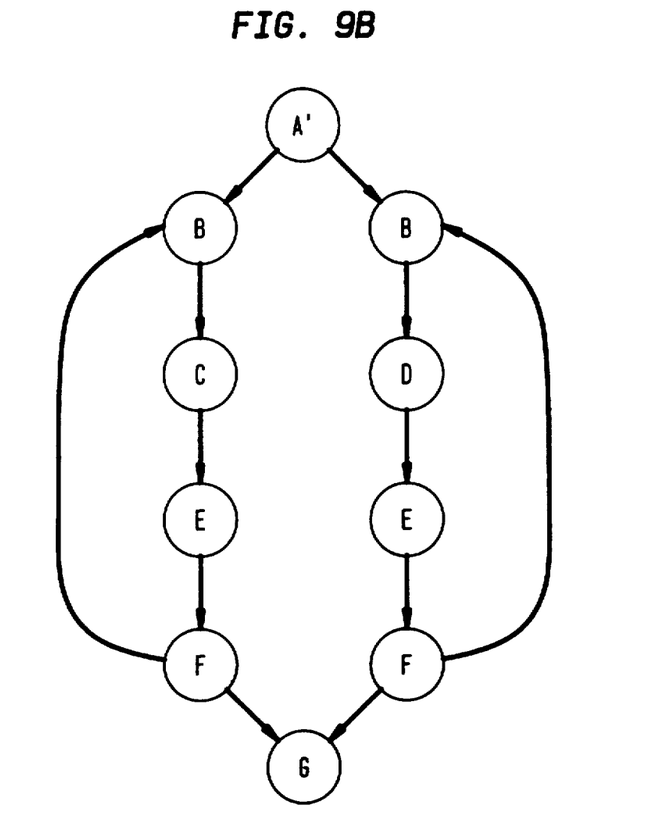
FIG. 9B is a graphical representation of the computer program shown in FIGS. 7A and 7B.

FIG. 8 illustrates the optimized exemplary program after the unreachable code has been deleted. The program of FIG. 8 is graphically depicted in FIG. 9B. The instruction at line 250 is considered unreachable because the instruction at line 200 jumps right over it. Similarly, the instruction at line 600 is considered unreachable because the instruction at line 550 jumps right over it.

While the invention has been described in terms of an exemplary embodiment, it is contemplated that it may be practiced as outlined above with modifications within the spirit and scope of the appended claims.

The invention claimed is:

1. A computer implemented method of reducing the execution time of a computer program which includes at least one instruction loop having a first conditional branch instruction internal to the loop which has a condition part and a branch part including a target address, wherein the condition part is invariant with respect to the instruction loop, said computer implemented method comprising the steps of:
   a) identifying said first conditional branch instruction;
   b) copying said first conditional branch instruction to a location in the computer program immediately before the instruction loop to create a second copy of the conditional branch instruction;
   c) copying the instruction loop to create a copy of the instruction loop, including a third copy of the conditional branch instruction, and inserting the copy of the instruction loop in a location in the computer program after the instruction loop, wherein said location is identified by a starting address;
   d) modifying the branch part of the second copy of the conditional branch instruction to branch to the copy of the instruction loop;
   e) inserting an unconditional branch instruction, to branch around the copy of the instruction loop, at a location in the computer program before the copy of the instruction loop; and
   f) deleting the first conditional branch instruction; and
   g) changing the third conditional branch instruction to an unconditional branch instruction, wherein said unconditional branch instruction includes a further target address and said further target address is said target address modified relative to said starting address such that the execution time of the computer program is reduced.

2. The method of claim 1, wherein the step a) is preceded by the step of removing computations, which are invariant with respect to the instruction loop, from the instruction loop.

3. The method of claim 1, wherein said instruction loop is nested within one or more outer loops and the step b) includes the step of copying the first conditional branch instruction to a location in the computer program immediately preceding an outmost loop for which the condition part of the first conditional branch instruction is invariant.

4. The method of claim 1, wherein steps a) through f) are repeated for each conditional branch in the instruction loop having a condition part which is invariant with respect to the instruction loop.

5. The method of claim 1, wherein a computer program consists of a plurality of instruction loops and step a) includes the steps of:
- a1) selecting one of said instruction loops for the identification of said first conditional branch instruction; and
- b1) evaluating a further instruction loop if said first conditional branch instruction is not identified in the selected instruction loop.

6. The method of claim 1, further comprising the step of:
- h) deleting unnecessary sections of the computer program.

7. The method of claim 1, wherein the step a) includes the step of:
- a1) representing the computer program as a flowgraph; and
- a2) evaluating the flowgraph to identify said first conditional branch instruction as being invariant with respect to the instruction loop.

8. The method of claim 7, wherein the step a1) further includes the steps of:
- a3) identifying region constants for the instruction loop; and
- a4) identifying said first conditional branch instruction as being controlled by at least one of the identified region constants.

9. The method of claim 7, wherein said first conditional branch instruction is identified only if it is represented by a flow graph as an articulation node of a strongly connected region.

10. A computer implemented method of reducing the execution time of a computer program which includes at least one instruction loop having a first conditional branch instruction which has a condition part and a branch part including a target address, wherein the condition part is invariant with respect to the instruction loop, said computer implemented method comprising the steps of:
- a) locating the instruction loop in the computer program
- b) identifying said first conditional branch instruction in the instruction loop;
- c) copying said first conditional branch instruction to a location in the computer program immediately before the instruction loop to create a second copy of the conditional branch instruction;
- d) copying the instruction loop to create a copy of the instruction loop, including a third copy of the conditional branch instruction, and inserting the copy of the instruction loop in a location in the computer program after the instruction loop, wherein said location is identified by a starting address;
- e) modifying the branch part of the second copy of the conditional branch instruction to branch to the copy of the instruction loop;
- f) inserting an unconditional branch instruction, to branch around the copy of the instruction loop, at a location in the computer program before the copy of the instruction loop;
- g) deleting the first conditional branch instruction; and
- h) changing the third conditional branch instruction to an unconditional branch instruction, wherein said unconditional branch instruction includes a further target address and said further target address is said target address modified relative to said starting address such that the execution time of the computer program is reduced.

* * * * *